United States Patent
Dubery et al.

(10) Patent No.: US 10,895,939 B2
(45) Date of Patent: Jan. 19, 2021

(54) SEGMENTED CAPACITIVE SENSOR, AND RELATED SYSTEMS, METHODS AND DEVICES

(71) Applicant: Atmel Corporation, Chandler, AZ (US)

(72) Inventors: John Dubery, Basingstoke (GB); Samuel Daniel Brunet, Fareham Hampsh (GB)

(73) Assignee: Atmel Corporation, Chandler, AZ (US)

( * ) Notice: Subject to any disclaimer, the term of this patent is extended or adjusted under 35 U.S.C. 154(b) by 46 days.

(21) Appl. No.: 16/216,412

(22) Filed: Dec. 11, 2018

(65) Prior Publication Data

US 2020/0004359 A1    Jan. 2, 2020

Related U.S. Application Data

(60) Provisional application No. 62/692,363, filed on Jun. 29, 2018.

(51) Int. Cl.
*G06F 3/044* (2006.01)
*G06F 3/041* (2006.01)

(52) U.S. Cl.
CPC .......... *G06F 3/044* (2013.01); *G06F 3/0416* (2013.01)

(58) Field of Classification Search
CPC .... G06F 3/044; G06F 3/0416; G06F 3/04164; G06F 3/0446
See application file for complete search history.

(56) References Cited

U.S. PATENT DOCUMENTS

| | | | |
|---|---|---|---|
| 8,810,543 B1 | 8/2014 | Kurikawa | |
| 9,619,088 B2 * | 4/2017 | Azumi | G06F 3/044 |
| 9,804,704 B2 * | 10/2017 | Azumi | G06F 3/044 |
| 9,811,231 B2 * | 11/2017 | Huang | G06F 3/047 |
| 2013/0015906 A1 * | 1/2013 | Yeh | G06F 3/0416 327/517 |
| 2013/0265279 A1 * | 10/2013 | Park | G06F 3/044 345/174 |
| 2013/0265282 A1 * | 10/2013 | Nakagawa | G06F 3/0416 345/174 |
| 2015/0116256 A1 * | 4/2015 | Hsu | G06F 3/0416 345/174 |
| 2015/0242022 A1 | 8/2015 | Hung et al. | |
| 2017/0255287 A1 * | 9/2017 | Huang | G06F 3/041 |

OTHER PUBLICATIONS

Outgoing—ISA/210—International Search Report dated Oct. 9, 2019 for WO Application No. PCT/US19/039901.
Outgoing Written Opinion of the ISA dated Oct. 9, 2019 for WO Application No. PCT/US19/039901.

* cited by examiner

*Primary Examiner* — Rodney Amadiz
(74) *Attorney, Agent, or Firm* — TraskBritt (57) ABSTRACT

Disclosed are segmented sensors and related systems, methods, and devices. In one embodiment, a capacitive sensor includes a first gird of sensor lines, a second grid of sensor lines, and an isolating region defined between the first grid of sensor lines and the second grid of sensor lines. Also disclosed are touch controllers configured for operable coupling to, and detecting touches at, a segmented sensor, and related systems, methods, and devices. In one embodiment, connectors of a touch controllers are configured for operable coupling to sensing lines from different segments of a segmented sensor and touch controllers are configured to detect touches at the different segments.

21 Claims, 7 Drawing Sheets

FIG. 1B
(State Of The Art)

FIG. 1A
(State Of The Art)

SEGMENTED CAPACITIVE SENSOR, AND RELATED SYSTEMS, METHODS AND DEVICES

CROSS-REFERENCE TO RELATED APPLICATION

This application claims the benefit under 35 U.S.C. § 119(e) of U.S. Provisional Patent Application Ser. No. 62/692,363, filed Jun. 29, 2018, the disclosure of which is hereby incorporated herein in its entirety by this reference.

TECHNICAL FIELD

This disclosure relates, generally, to capacitive sensors and, more specifically, certain embodiments relate to segmented sensors and capacitive sensing systems configured to use the same.

BACKGROUND

Touch screen sensors, which may be characterized as a transparent conductive layer on top of a display that can detect a touch (e.g., a smart phone, tablet, appliance interface, or the like), are typically arranged in a row/column grid of conductors (i.e., electrically isolated lines of conductive material) that may be represented as an n by m matrix. Generally, these conductors may be referred to as sensor lines, and may also be characterized as sensing lines. Each sensor may include a number of connectors on each axis where the rows of lines and columns of lines terminate. Such connectors are externally accessible (e.g., by way of pins) and may be, for example, operatively coupled to a touch controller that includes acquisition circuitry and processing circuitry configured to determine information about touches detected at a touch screen sensor.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following

DETAILED DESCRIPTION

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

As understood for purposes of the embodiments described in this disclosure, a touch screen sensor or just "sensor" may respond to an object's (such as a finger, stylus, other detectable object, without limitation) contact with, or the object's proximity to, a contact-sensitive area of the sensor. In this disclosure, "contact" and "touch" are meant to encompass both an object's physical contact with a contact-sensitive area and an object's presence within proximity of a contact-sensitive area without physical contact. Actual physical contact with a sensor is not required.

When an object contacts a touch screen sensor, a change in capacitance may occur within the sensor at or near the location of the contact. An analog acquisition front-end may "detect" the touch if it meets a certain threshold or some other criterion. "Charge-then-transfer" is a technique implemented in some touch-acquisition front-ends to detect capacitive changes, whereby a sensing capacitor is charged responsive to the change in capacitance (e.g., charged faster or slower) and the charge is transferred to an integrating capacitor over multiple charge-transfer cycles. The amount of charge associated with such a charge-transfer may be converted to digital signals by an analog-to-digital converter (ADC), and a digital controller may process those digital signals to determine measurements and if an object contacted the sensor.

Self-capacitance sensors are capacitive field sensors that detect/respond to changes in capacitance to ground. They are typically laid out in an array of rows and columns that react independently to a touch. By way of non-limiting example, a self-cap sensor may include a circuit employing repetitive charge-then-transfer cycles using common integrated CMOS push-pull driver circuitry having floating terminals. Mutual capacitance sensors are capacitive field sensors that detect/respond to changes in capacitance between two electrodes: a drive electrode and a sense electrode. The drive electrode and sense electrode pairs at each intersection of drive and sense lines form a capacitor. Self-capacitance and mutual capacitance arrangements and/or techniques may be used exclusively, and also may be used in the same touch sensor and controller, and may be complimentary to each other, for example, self-capacitance may be used to confirm a touch detected using a mutual capacitance.

Touch screen sensors may be overlaid in a 2-dimensional (2-D) arrangement for a 2-D contact sensitive surface that may be incorporated into a contact sensitive surface—for example, of a display—and may facilitate user interaction with an associated appliance. Insulating protective layers (e.g., resins, glass, plastic, etc.) may be used to cover touch sensors. As used herein, a "touch display" is a display (such as a liquid crystal display (LCD), thin-film-transistor (TFT) LCD, or a light emitting diode (LED) display) that incorporates touch screen sensors or is used in conjunction with an adjacent touch screen sensor.

Using the example of a touch screen sensor that uses a matrix sensor approach of mutual capacitance sensors employing charge-transfer techniques, drive electrodes may extend in rows on one side of a substrate and sense electrodes may extend in columns on the other side of the substrate so as to define a "matrix" array of N by M nodes. Each node corresponds to an intersection between the electrically conductive lines of a drive electrode and of a sense electrode. A drive electrode simultaneously drives all of the nodes in a given row and a sense electrode senses all of the nodes in a given column. The capacitive coupling of the drive electrode and sense electrode (mutual capacitance), or the coupling of a sense electrode and ground (self-capacitance), at a node position may be separately measured or both measured in response to a capacitive change indicative of a touch event. For example, if a drive signal is applied to the drive electrode of row 2 and a sense electrode of column 3 is active then the node position is: (row 2, column 3). Nodes may be scanned by sequencing through different combinations of drive and sense electrodes. In one mode the drive electrodes may be driven sequentially while the sense electrodes are all continuously monitored. In another mode each sense electrode may be sampled sequentially.

While touch screen sensors of this disclosure find particular application for use with displays, they are not limited to touch displays, and may be incorporated into any contact sensitive surface, for example, touch pads and touch buttons, without limitation; and may be transparent or non-transparent.

Figure 1A:
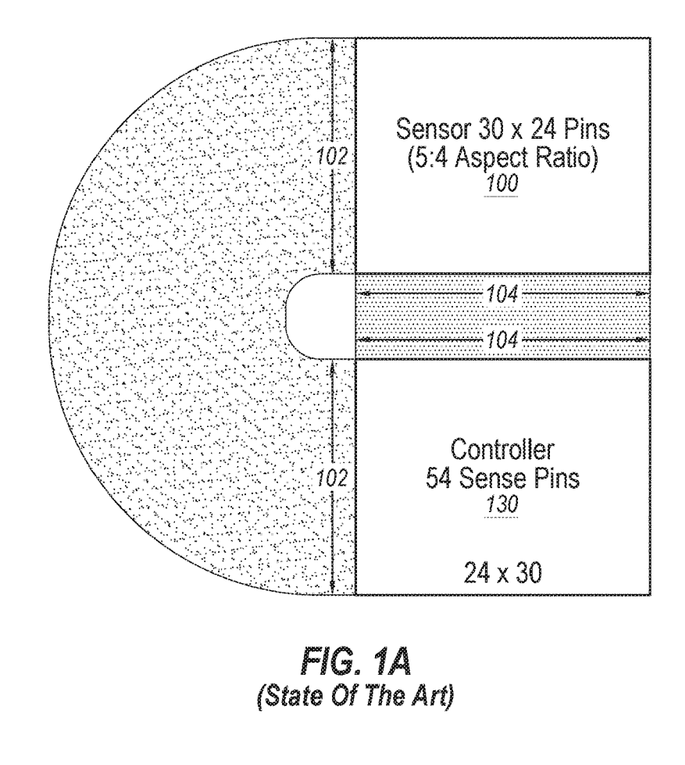
FIG. 1A shows a simplified block diagram of a conventional coupling between a touch screen sensor and a touch controller.

FIG. 1A is a diagram of a conventional coupling between a touch screen sensor and controller known to the inventors of this disclosure. The touch sensor 100 has approximately 5 column lines for every 4 row lines (indicated by row pins 102 and column pins 104), or 5:4, which, when arranged with equal spacing between the lines, means that the width of the sensor 100 is substantially the same as the height of the sensor. This may also be characterized as having a "normal-aspect-ratio" or being configured for "normal-aspect-ratio" applications, for example, a normal-aspect-ratio display or touch pad. Another ratio commonly associated with normal-aspect-ratio is 4 column lines for every 3 row lines, or 4:3.

Figure 1B:
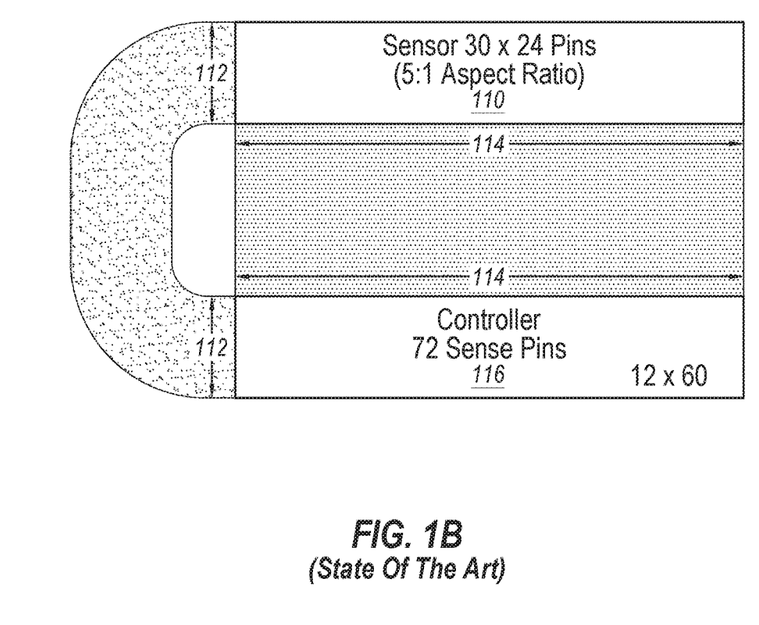
FIG. 1B shows another simplified block diagram of a conventional coupling between a touch screen sensor and controller.

FIG. 1B is a diagram of another conventional coupling between a touch screen sensor and controller known to the inventors of this disclosure. The touch screen sensor 110 has more columns of lines than rows of lines (as indicated by pins 114 and pins 112, respectively), or a 5:1 ratio of column lines to row lines, which, when arranged with equal spacing between the lines, means that the width of the sensor 110 is longer than the height of the sensor. This may also be characterized as having a "wide-aspect-ratio" or being configured for "wide-aspect-ratio" applications, for example, a wide-aspect-ratio display. In this disclosure, touch screen sensors with a long-to-short axis ratio of about 2:1 and greater are considered wide-aspect-ratios, as is the common understanding of those having ordinary skill in the art.

The amount of touch processing for a touch screen depends, to a large degree, on the area of the touch screen. So, by way of non-limiting example, the amount of touch processing for touches at a 24×30 sensor is substantially the same as the amount of touch processing for touches at a 12×60 sensor. However, the number of connectors at a 24×30 sensor (approximately 54) is fewer than the number of connectors for a 12×60 sensor (approximately 72), even though the area of both is 720 (notably, "area" may further characterized as the number of nodes defined by the intersection of sensor lines). So, while the 24×30 sensor 100 of FIG. 1A and the 12×60 sensor 110 of FIG. 1B use substantially the same amount of touch processing for touches, more pins are needed at the touch controller 116 for the 12×60 sensor 110 than at the touch controller 130 for the 30×24 (approximately 18 more pins). Unless otherwise stated, when describing dimensions of a sensor herein a row× column convention is used for ease of description.

Generally, when comparing touch controllers with different numbers of pins, the touch controller with more pins will be larger and require a larger chip than the touch controller with fewer pins—and there will be a corresponding higher cost. So, for the same touch processing amount, the conventional touch controller used with wide-aspect-ratio sensors in a capacitive touch sensing system is more expensive than the touch controller used with standard-aspect-ratio sensors in a capacitive touch sensing system.

The inventors of this disclosure appreciate a need for a capacitive touch sensor suitable for wide-aspect-ratio applications that has fewer connectors and less processing capability than conventional capacitive touch sensors used for such applications. One advantage of such a sensor is that fewer pins are needed at a touch controller to couple with the sensor and thus, a capacitive touch sensing system for wide-aspect-ratio applications may be simpler and include less costly components as compared to conventional capacitive touch sensing systems that use more expensive touch controllers.

Figure 2:
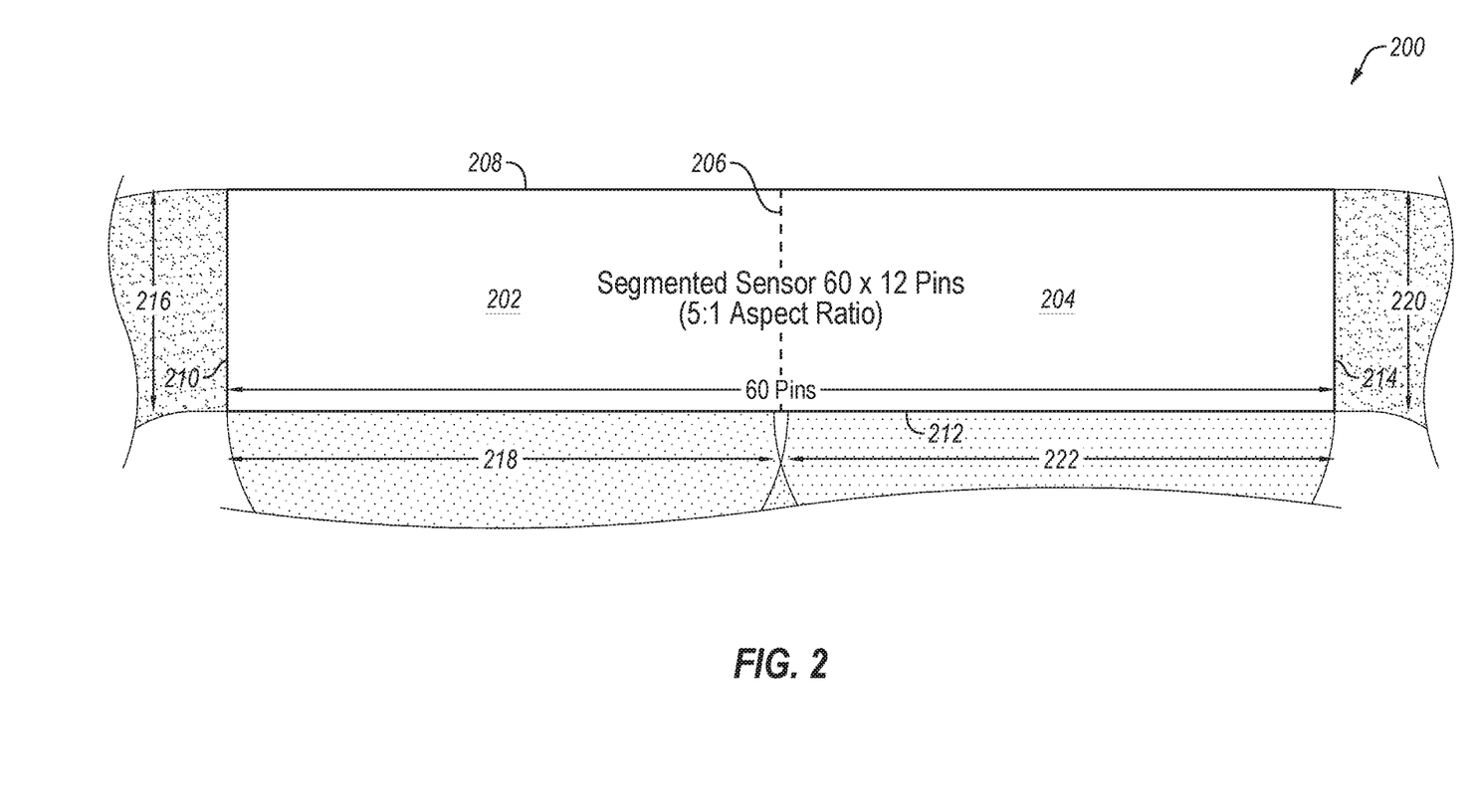
FIG. 2 shows a simplified block diagram of a segmented capacitive sensor architecture, in accordance with one or more embodiments of the disclosure.

Accordingly, one or more embodiments of the disclosure relate, generally, to a segmented capacitive sensor (which may be referred to, herein, simply as a "segmented sensor"). FIG. 2 shows a segmented sensor 200 that includes two independent segments, 202 and 204. For the sake of convenience, and not by way of limitation, the two segments may be referred to as "left segment" 202 and "right segment" 204. In the example shown in FIG. 1, each left segment 202 and right segment 204 is defined on three sides by at least part of each of the three edges 208, 210, 212 and 214 of the sensor 200 and on a fourth side by an isolating region 206. While in this example left and right segments 202 and 204 are shown having uniform number of nodes, the disclosure is not so limited and it is specifically contemplated that in one or more embodiments segments of a multi-segment sensor may non-uniform numbers of nodes (e.g., some segments may have different numbers of nodes than other segments). Moreover, while in the example shown in FIG. 2 segmented sensor 200 has two segments, 202 and 204, the disclosure is not limited to two segments, and one of ordinary skill in the art would understand that embodiments of the disclosure are scalable to more than two segments. Indeed, it is specifically contemplated that a segmented sensor may include more than two segments.

The isolating region 206 is configured to electrically isolate the left segment 202 and the right segment 204. In one or more embodiments, at least part of the isolating region 206 may be filled with an insulating material, define air gaps providing electrical isolation, or combinations thereof. The isolating region 206 substantially divides the segmented sensor 200 into two equal halves, and each of the left segment 202 and right segment 204 may be characterized as substantially half of the segmented sensor 200. In one or more embodiments, each of the left segment 202 and right segment 204 may include active portions, and, optionally, inactive portions, with the active portions configured as, generally, sensor lines for capacitive sensing.

In one or more embodiments, the isolating region 206 may be formed by cutting the long-axis sensor lines (not shown) substantially perpendicular to the direction of the long-axis sensor lines. Once cut, the long-axis sensor lines of the left segment 202 and long-axis sensor lines of the right segment 204 operate independently. By way of non-limiting example, a touch wholly at the left segment 202 and detected at the left segment 202 is not detected at the right segment 204. In other words, a measurably relevant capacitive effect at the right segment 204 is not realized responsive to a touch at the left segment 202.

Each left segment 202 and right segment 204 may also include a number of connectors positioned along a respective first edge and a respective second edge of the segment. The left segment 202 includes long-axis connectors 216 and short-axis connectors 218. The right segment 204 includes long-axis connectors 220 and short-axis connectors 222. The short-axis connectors 218 and short-axis connectors 222 may be arranged on a side corresponding to the same edge of the segmented sensor, here, edge 212. The long-axis connectors 216 and long-axis connectors 220 may be arranged on sides corresponding to different edges of the segmented sensor, here, edge 210 and edge 214, respectively. In one or more embodiments, each left segment 202 and right segment 204 of the segmented sensor 200 has the same number of connectors. The sensor connectors, e.g., connectors 216, 218, 220, and 222 may, in one or more embodiments, be electrically conductive pins.

Figure 3A:
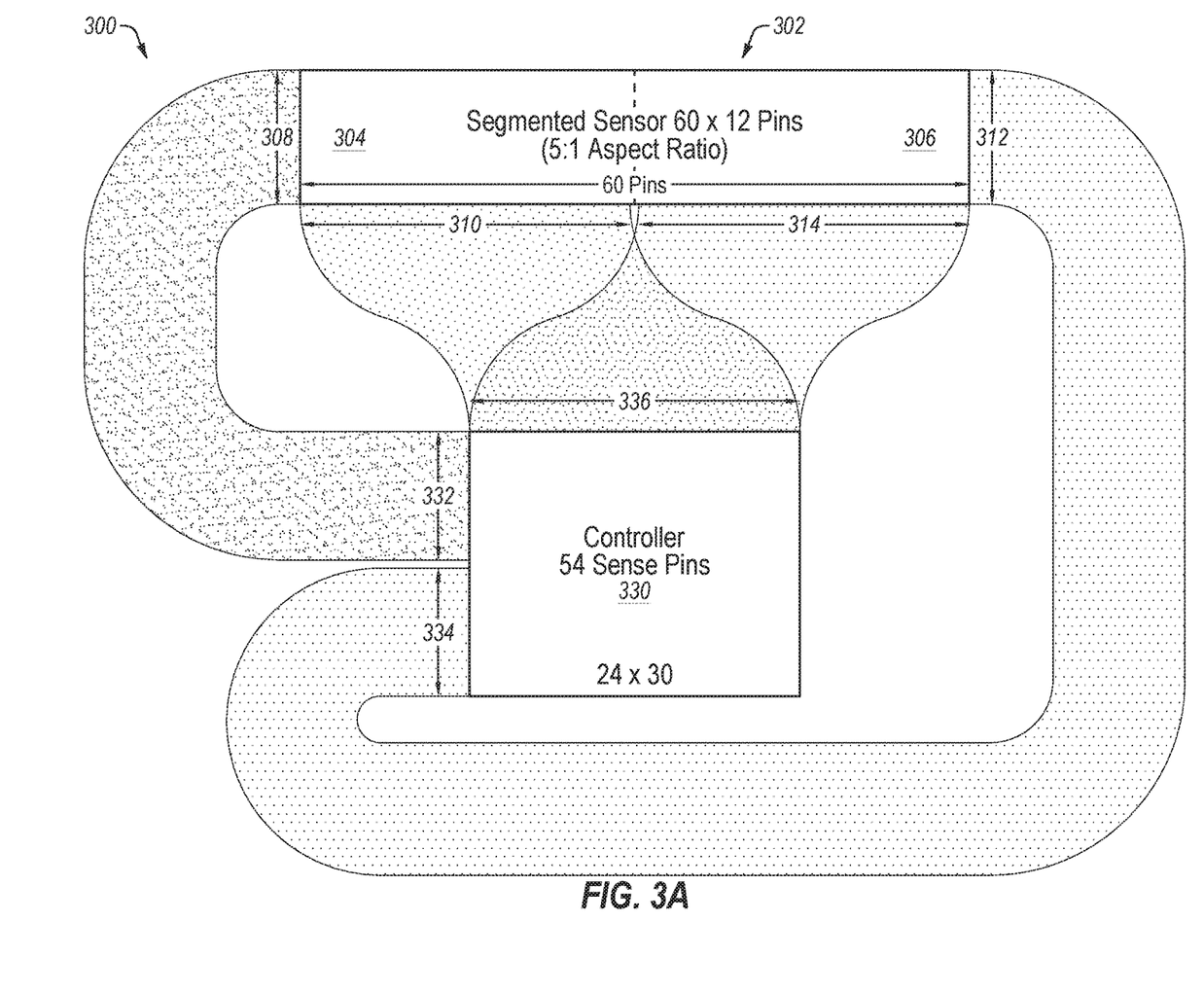
FIG. 3A shows a simplified block diagram of a capacitive sensing system that utilizes a segmented capacitive sensor, in accordance with one or more embodiments of the disclosure.

As shown in FIG. 3A, one or more embodiments relate, generally, to a capacitive sensing system 300 that includes a segmented sensor 302 operatively coupled to a touch controller 330. The connectors of left segment 304 and right segment 306 may be operatively coupled to input/output (I/O) connectors of the touch controller 330. In one or more embodiments, the I/O connectors may be, for example, be electrically conductive pins, electrically conductive adhesive, or other suitable electrically conductive material, without limitation.

The connectors 308 and 312 of the long-axis sensor lines of the left segment 304 and right segment 306, respectively, may be operatively coupled to independent connectors 332 and 334 of the touch controller 330. Some or all of the short-axis connectors 310 and 314 of the short-axis sensor lines of the left segment 304 and right segment 306 may be operatively coupled in parallel to connectors 336 of the touch controller 330. For the short-axis connectors 310 and 314 of the left segment 304 and right segment 306 that are operatively coupled in parallel to connectors 336 of the touch controller 330, at least one short-axis connector 310 of the left segment 304 and at least one short-axis connector 314 of the right segment 306 are operatively coupled to the same connector 336 of the touch controller 330.

In one or more embodiments, sensing lines of a sensor that are operatively coupled to the same connector of a touch controller may be referred to herein as "operatively coupled in parallel," and the connector at the controller to which they are operatively coupled may be referred to herein as a "parallel connector." A sensing line of a sensor that is operatively coupled to a connector of a touch controller, and no other sensing line is operatively coupled to the same connector, may be referred to herein as "operatively coupled independently" to the connector, and the connector at the touch controller may be referred to herein as an "independent connector."

In one or more embodiments of the disclosure, no specific order is required for the connectors between sensor lines (long axis and short axis) and connectors of a touch controller. For example, consecutive sensor lines may be operatively coupled to non-consecutive (i.e., non-adjacent) connectors of the touch controller, which may also be characterized as "interleaving" sensor line connections at a touch controller.

One or more embodiments relate, generally, to a capacitive sensing system that includes one or more touch controllers operatively coupled to a segmented sensor. In one embodiment, processing of sensor signals received from a segmented sensor may be processed by two-or-more touch controllers. Any suitable technique may be used to divvy processing among the touch controllers, including without limitation, by segment, by sensor connectors, by type of touch (e.g., single, multi-, force, etc.), and combinations thereof.

One or more embodiments relate, generally, to a touch controller configured to discriminate between sensed signals from the left segment and sensed signals from the right segment, which may be referred to herein as left sensed signals and right sensed signals, respectively.

Figure 3B:
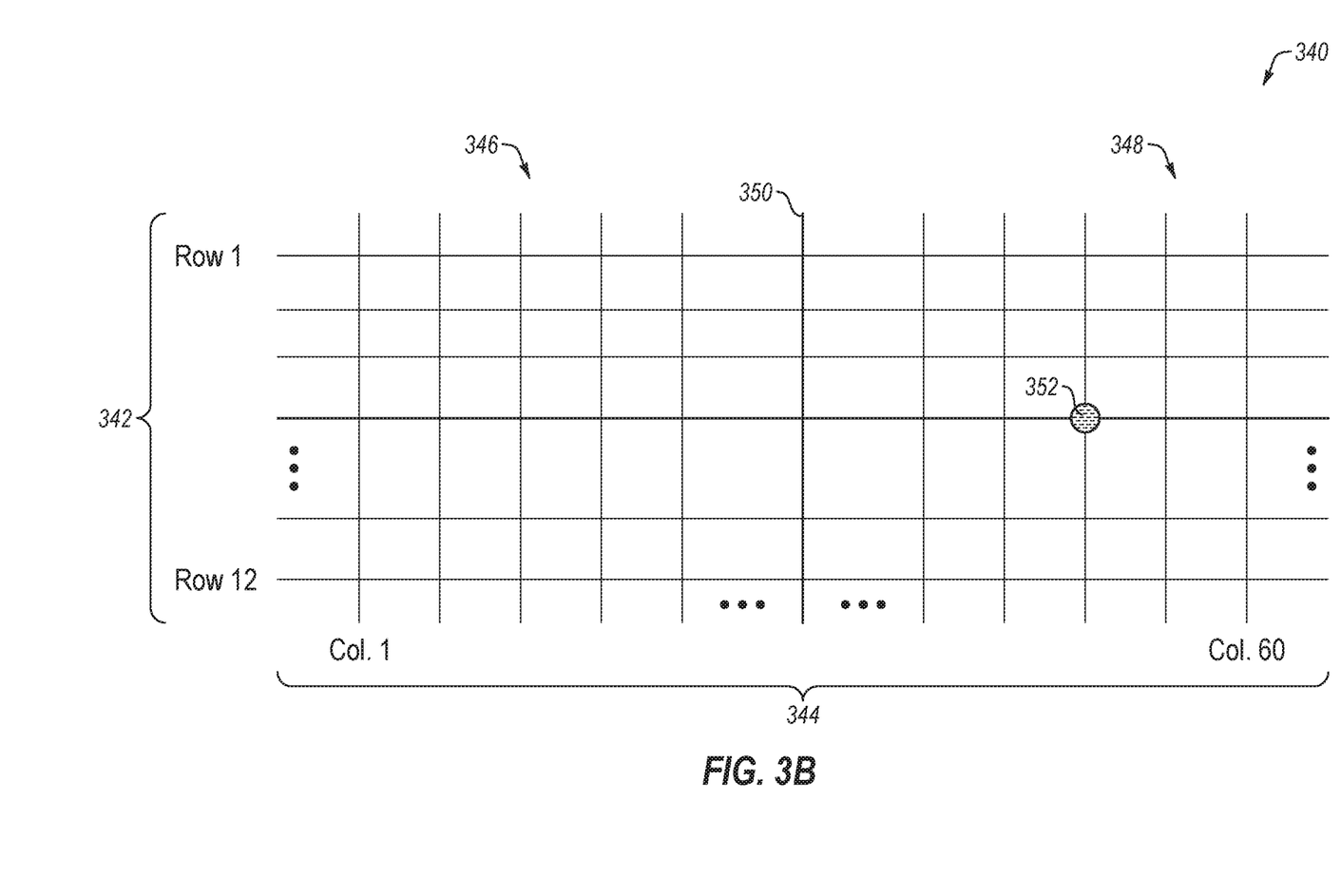
FIG. 3B shows an example touch at a segmented capacitive sensor (represented as a grid), in accordance with one or more embodiments of the disclosure.

FIG. 3B is a diagram of a sensor line grid 340 with sensor lines that are segmented, in accordance with one or more embodiments of the disclosure. In one or more embodiments, the sensor line grid 340 may be configured for wide-aspect-ratio applications, such as sensor 302 (FIG. 3A), and comprises rows of long-axis sensor lines 342 (row 1 to row 12) and columns of short-axis sensor lines 344 (column 1 to column 60). An inactive region 350 divides the sensor line grid 340 and defines a left segment 346 and a right segment 348 of sensor line grid 340. For explanatory purposes, a capacitive change at location 352 of right segment 348 is shown which is associated with a touch event.

In one embodiment, touch controller 330 (FIG. 3A) may include a touch processor (not shown) configured to discriminate between a left sensed signal and a right sensed signal at parallel connectors of a touch controller 330 responsive to one or more drive signals used in a mutual capacitance sensing technique. More particularly, when a sensed signal is received by the touch processor, the touch processor may be configured to determine whether the sensed signal corresponds to a left segment drive signal or corresponds to a right segment drive signal. In one embodiment, the touch processor may determine that a sensed signal corresponds to left segment drive signal if the sensed signal is received during a first sensing period of a mutual capacitance sensing operation, and determine that a sensed signal corresponds to a right segment drive signal if the sensed signal is received during a second sensing period of a mutual capacitance sensing operation. More particularly, a mutual capacitance sensing operation may occur over a sensing interval, and that sensing interval may comprise a first sensing period and a second sensing period. The first sensing period may be associated with one of the left or right segment and the second sensing period may be associated with the other segment. A sensing interval may be associated with a sense operation.

In another embodiment, a sensing interval may include many sensing periods, some of the sensing periods associated with one segment, and other sensing periods associated with the other segment. The sensing periods associated with a segment may or may not be consecutive, for example, assume a sensing interval has four sensing periods (P1-P4) where one of four groups of sensing lines of each segment is associated with each sensing period, e.g., P1(L1 and R4), P2 (L2, and R3), P3 (L3 and R2), and P4(L4 and R1). Also assume that groups sensing lines for each segment are operatively coupled to the touch controller in parallel (e.g., L1 and R1 are operatively coupled in parallel, L2 and R2 are operatively coupled in parallel, without limitation). Groups of sensing lines may be simultaneously and near simultaneously sensed during each sensing period. That is, L1 and R4 may be sensed at the same time, L2 and R3 may be sensed at the same time, etc. In this configuration, the touch processor may discriminate between the left segment and right segment based on sensing period and connectors associated with the groups of sensing lines.

In one or more embodiments, the sensing interval and sensing periods may be measurable using any suitable technique, including in terms of time, drive lines (e.g., a first driven drive line to a last driven drive line), number of operations, without limitation.

Figure 4A:
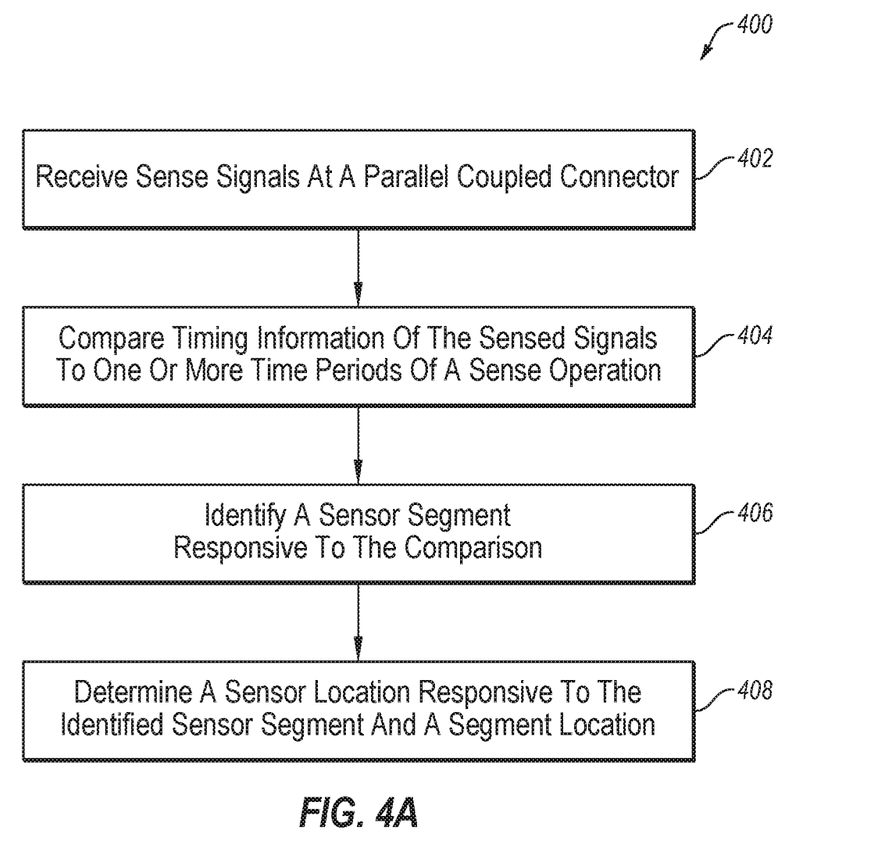
FIG. 4A shows a flowchart of a touch processing process for a segmented sensor, in accordance with one or more embodiments of the disclosure.

FIG. 4A shows a flowchart of a touch processing process 400 for a segmented sensor, in accordance with one or more embodiments of the disclosure. In operation 402, one or more sense signals are received associated with a parallel coupled connector of a touch controller. In operation 404, timing information of the sensed signals is compared to one or more time periods of a sense operation. The time periods may be associated with drive signals asserted at a touch sensor. In operation 406, a sensor segment is identified responsive to the comparison. The sensor segment may be one of a left segment or a right segment. In operation 408, a sensor location is determined responsive to the identified sensor segment and a segment location identified responsive to the sensed signals. In another embodiment, a sensor location may be determined responsive to the identified sensor segment and the sensed signals.

Use of the terms "drive lines" and/or "sense lines" in this disclosure is not intended to require a specific technique for capacitive sensing, such as self-capacitance or mutual capacitance, unless specifically indicated.

Though, in some examples, drive lines or sense lines are associated with long-axis lines and short-axis lines, that is not a requirement. Drive lines may be associated with short-axis lines and sense lines may be associated with long-axis lines.

In another embodiment, the touch controller include a touch processor (not shown) configured to discriminate between a left sensed signal and a ride sensed signal responsive to sensed signals received during a self-capacitance sensing operation. During self-capacitance sensing, the touch processor typically receives sensed signals from one or more long-axis sensor lines and one or more short-axis sensor lines. The touch processor may be configured to determine whether a sensed signal corresponds to a left segment or a right segment responsive to a sensed signal received from a short-axis sensor line. More particularly, the touch processor may be configured to determine that a sensed signal is received at one or more pins that are associated with one or more long-axis sensor lines.

Figure 4B:
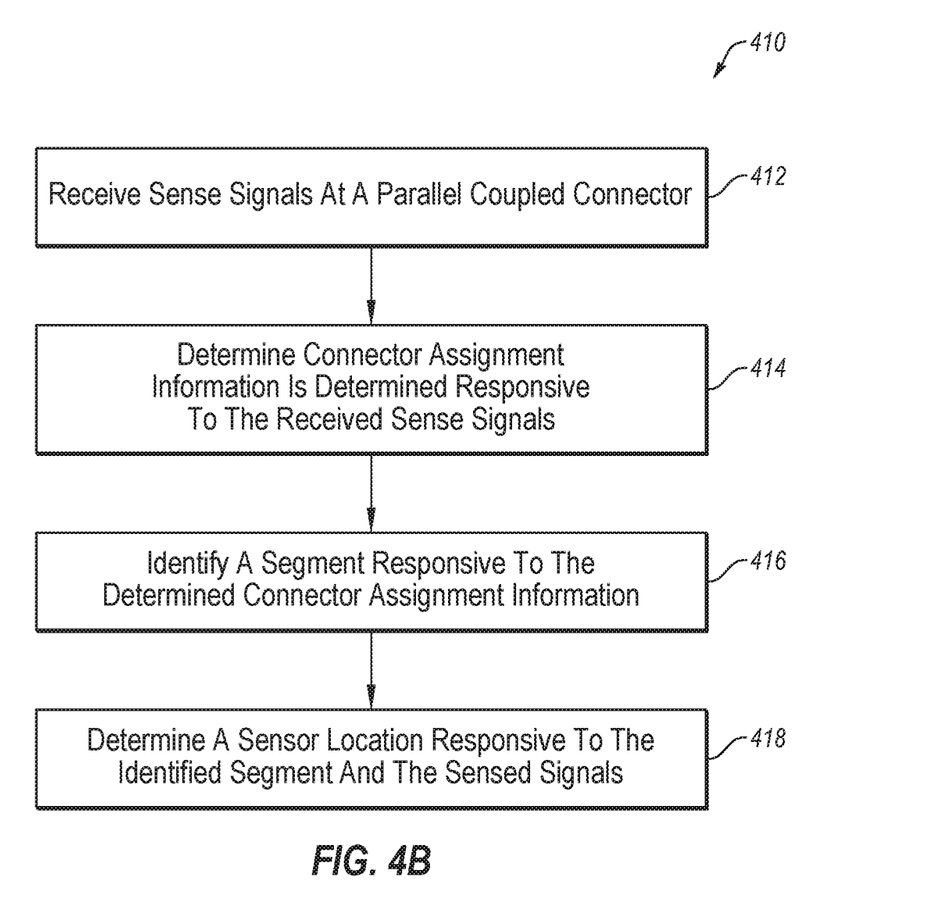
FIG. 4B shows a flowchart of a touch processing process for a segmented sensor, in accordance with one or more embodiments of the disclosure.

FIG. 4B shows a flowchart of a touch processing process 410 for a segmented sensor, in accordance with one or more embodiments of the disclosure. In operation 412, sense signals are received associated with a parallel coupled connector of a touch controller. In operation 414, connector assignment information is determined responsive to the received sense signals. In one embodiment, connector assignment information may identify connectors of the controller that are operatively coupled to connectors (and therefore sensing lines) of sensor segments. Any appropriate level of granularity may be used, for example, connector assignment information may describe the coupling at a connector/sensing level and/or a connector/segment level. For example, connector assignment information may associate one or more connectors of a touch controller with a first segment, a second segment, or both segments (e.g., in the case of parallel connections).

In operation 416, a segment is identified responsive to the determined connector assignment information. In one embodiment, a segment may be identified responsive to a look-up-table that is searchable by connector assignment information and returns a segment identifier responsive to searched connector assignment information. In operation 418, a sensor location is determined responsive to the identified segment and the sense signals. In one embodiment, a segment location may be identified responsive to the sense signals and a sensor location may be identified responsive to the identified segment and the identified segment location.

Depending on the configuration of a touch processor, location information of a touch may be determined for a left segment or a right segment, but further processing is required to adjust the determined location for the segmented sensor as a whole. For example, if a touch is identified at location 352 (FIG. 3A), which corresponds to the center of the right segment 348, but due to the parallel connection at some of the connectors of a touch controller, the touch processor may not "realize" that the location is actually in the right third of the sensor and not the center of the right segment 348. In one or more embodiments, the location may be corrected when the location is first determined based on the segment where the touch occurred and the sensed signals. For example, if sensed signals are received that could correspond to a row 10 column 25 or a row 10 column 55 of a segmented sensor, then the touch processor may determine the column after determining the segment. In one or more other embodiments, the touch processor may include one or more location offsets that are indicative of the difference between a location on a segmented touch sensor and a location on the left or right segment of the touch sensor. The touch processor may be configured to determine a segmented sensor location responsive to a segment location and an offset associated with that segment location.

Figure 5:
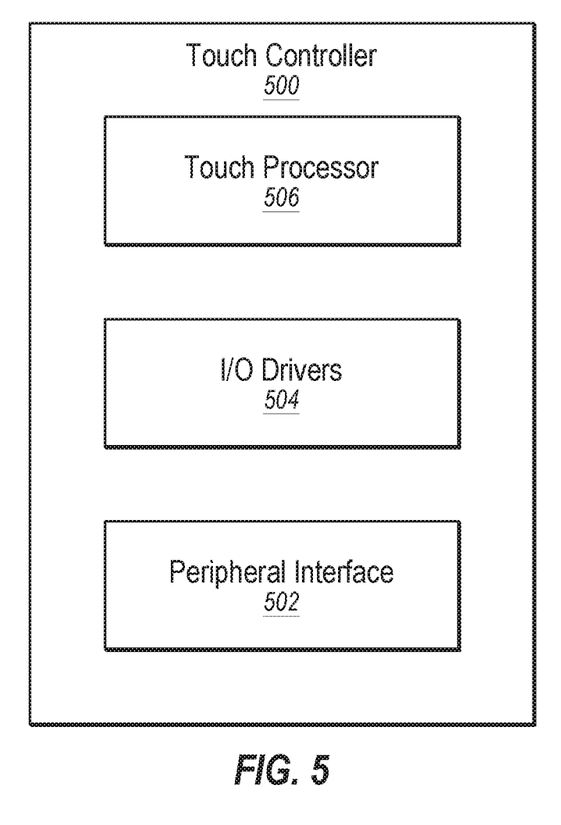
FIG. 5 shows a functional block diagram of a touch controller configured for use with a segmented sensor, in accordance with one or more embodiments of the disclosure.

FIG. 5 shows a functional block diagram of a touch controller 500, according to one or more embodiments of the disclosure. In one embodiment, the touch controller 500 may include a touch processor 506, I/O drivers 504 and a peripheral interface 502. The touch processor 506 may be configured to perform one or more aspects of sense operations including process sensed signals (and in some cases, drive signals) and determine touch information, including without limitation, sensor and segment location associated with touches. The I/O drivers 504 may be configured to control one or more connectors, including without limitation, general purpose input output pins, of the touch controller 500. The connectors may be configured to be operatively coupled to capacitive sensor lines. Peripheral interface 502 may be configured to communicate with, or over, a data bus, such as a UART, USART, I²C, etc.

Many of the functional descriptions in this specification may be illustrated, described or labeled as modules, threads, steps, or other segregations of programming code, including firmware, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices, or the like.

Modules may also be implemented using software or firmware, stored on a physical storage device (e.g., a computer-readable media), in memory (e.g. non-transitory storage devices used as system memory), or a combination thereof for execution by various types of processors.

An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are flash memory and random-access-memory (RAM). Another example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

Any characterization in this disclosure of something as 'typical,' 'conventional,' or 'known' does not necessarily mean that it is disclosed in the prior art or that the discussed aspects are appreciated in the prior art. Nor does it necessarily mean that, in the relevant field, it is widely known, well-understood, or routinely used.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A capacitive sensing system, comprising:
    a segmented sensor comprising rows of sensing lines and columns of sensing lines; and
    one or more touch controllers operatively coupled to the segmented sensor, a touch controller of the one or more touch controllers comprising:
        a first group of connectors and a second group of connectors, and wherein:
            at least some drive lines of the columns or rows of sensing lines are operatively coupled independently to the first group of connectors; and
            at least some sense lines of the rows or columns of sensing lines are operatively coupled in parallel to the second group of connectors.

2. The system of claim 1, where the rows of sensing lines and columns of sensing lines are coupled to a touch sensor non-consecutively.

3. The system of claim 1, wherein the system is configured for mutual capacitance sensing.

4. The system of claim 1, wherein the system is configured for self-capacitance sensing.

5. A capacitive sensing system, comprising:
    a segmented sensor comprising rows of sensing lines and columns of sensing lines; and
    one or more touch controllers operatively coupled to the segmented sensor, a touch controller of the one or more touch controllers comprising:
        a first group of connectors and a second group of connectors, and wherein:
            the columns or rows of sensing lines are operatively coupled independently to the first group of connectors; and
            at least some of the other rows or columns of sensing lines are operatively coupled in parallel to the second group of connectors,
        wherein some connectors of the first group of connectors are associated with a first segment of the segmented sensor and other connectors of the first group of connectors are associated with a second segment of the segmented sensor,
        wherein some connectors of the second group of connectors are associated with the first segment of the segmented sensor and associated with the second segment of the segmented sensor.

6. The system of claim 5, wherein:
    the first segment comprises first rows of sensing lines of the rows of sensing lines of the segmented sensor; and
    the second segment comprises second rows of sensing lines of the rows of sensing lines of the segmented sensor, and
    wherein the first rows of sensing lines are electrically isolated from the second rows of sensing lines.

7. A capacitive sensor, comprising:
    a first grid of sensor lines comprising first rows of sensor lines and first columns of sensor lines;
    a second grid of sensor lines comprising second rows of sensor lines and second columns of sensor lines;
    an isolating region defined between the first grid of sensor lines and the second grid of sensor lines; and
    one or more touch controllers operatively coupled to the first grid of sensor lines and the second grid of sensor lines, a touch controller of the one or more touch controllers comprising:
        a first group of connectors and a second group of connectors, and wherein:
            one of columns or rows of sensor lines of the first grid and the second grid are operatively coupled independently to the first group of connectors; and
            at least some of the other of rows or columns of sensor lines of the first grid and the second grid are operatively coupled in parallel to the second group of connectors.

8. The capacitive sensor of claim 7, wherein at least part of the isolating region defines an air gap.

9. The capacitive sensor of claim 7, wherein at least part of the isolating region comprises an electrically insulating material.

10. The capacitive sensor of claim 7, further comprising:
first connectors operatively coupled to one or more sensor lines of the first grid; and
second connectors operatively coupled to one or more sensor lines of the second grid.

11. The capacitive sensor of claim 7, wherein at least the first rows of sensor lines are electrically isolated from the second rows of sensor lines.

12. A touch controller, comprising:
a first group of connectors and a second group of connectors;
a processor; and
a non-transitory storage medium, the non-transitory storage medium having stored thereon machine-readable instructions that, when executed by the processor, are adapted to enable the processor to:
determine touch location information responsive to one or more sensed signals, wherein the touch location information corresponds to a location at a segmented sensor when:
columns or rows of sensor lines of the segmented sensor are operatively coupled independently to the first group of connectors; and
at least some of rows or columns of sensor lines of the segmented sensor that are associated with at least some of the one or more sensed signals are operatively coupled in parallel to the second group of connectors.

13. The touch controller of claim 12, wherein the machine-readable instructions, when executed by the processor, are further adapted to enable the processor to discriminate between first sensed signals associated with a first segment of the segmented sensor and second sensed signals associated with a second segment of the segmented sensor.

14. The touch controller of claim 12, further comprising connectors, wherein the machine-readable instructions, when executed by the processor, are further adapted to enable the processor to associate a first portion of the first group of the connectors with a first segment of the segmented sensor and associate a second portion of the first group of the connectors with a second segment of the segmented sensor.

15. The touch controller of claim 14, wherein the machine-readable instructions, when executed by the processor, are further adapted to enable the processor to associate some connectors of the second group of connectors with both the first segment and the second segment of the segmented sensor.

16. The touch controller of claim 12, wherein the machine-readable instructions, when executed by the processor, are further adapted to enable the processor to associate a sensed signal of the one or more sensed signals with a first segment of the segmented sensor or a second segment of the segmented sensor responsive to a connector assignment, wherein the connector assignment is for a connector configured to be operatively coupled individually to a sensing line of the first segment or the second segment.

17. The touch controller of claim 12, wherein the machine-readable instructions, when executed by the processor, are further adapted to enable the processor to associate a sensed signal of the one or more sensed signals with a first segment of the segmented sensor or a second segment of the segmented sensor responsive to a connector assignment, wherein the connector assignment is for a connector configured to be operatively coupled in parallel to a sensing line of the first segment and a sensing line of the second segment.

18. The touch controller of claim 12, wherein the machine-readable instructions, when executed by the processor, are further adapted to enable the processor to change the touch location information responsive to a segment of the segmented sensor associated with the one or more sensed signals.

19. The touch controller of claim 18, wherein changing the touch location information comprises:
determining a segment of the segmented sensor associated with the touch location information;
determining an offset responsive to the segment; and
determining an adjusted touch location responsive to the determined offset.

20. The touch controller of claim 12, wherein:
the first group of connectors are configured to be operatively coupled to columns of sensing lines; and
the second group of connectors are configured to be operatively coupled in parallel to at least some rows of sensing lines.

21. The touch controller of claim 12, wherein the machine-readable instructions, when executed by the processor, are further adapted to enable the processor to:
identify a first segment of the segmented sensor associated with a first sensed signal responsive to a first connector assignment associated with a first connector; and
identify a second segment of the segmented sensor associated with a second sensed signal responsive to a second connector assignment associated with a second connector,
wherein the first connector and the second connector are arranged consecutively and the first segment and the second segment are different segments of the segmented sensor.

* * * * *